United States Patent [19]

White et al.

[11] 4,076,656

[45] Feb. 28, 1978

[54] METHOD OF PRODUCING POROUS PLASTIC MATERIALS

[75] Inventors: LeRoy A. White, Somers; William H. Holley, Rockville, both of Conn.

[73] Assignee: DeBell & Richardson, Inc., Enfield, Conn.

[21] Appl. No.: 381,258

[22] Filed: Jul. 20, 1973

Related U.S. Application Data

[63] Continuation-in-part of Ser. No. 203,471, Nov. 30, 1971, abandoned.

[51] Int. Cl.$^2$ .............................. C08J 9/10; C08J 9/26
[52] U.S. Cl. ................................. 260/2.5 M; 106/122; 260/2.5 AF; 260/2.5 BD
[58] Field of Search ....... 260/2.5 M, 2.5 AF, 2.5 BD; 106/122

[56] References Cited

U.S. PATENT DOCUMENTS

| 3,536,796 | 10/1970 | Rock | 260/2.5 M |
| 3,551,538 | 12/1970 | Yamamoto et al. | 260/2.5 M |

Primary Examiner—Wilbert J. Briggs, Sr.
Attorney, Agent, or Firm—Chapin, Neal and Dempsey

[57] ABSTRACT

Method of producing porous synthetic plastic compositions by blending into a polymer at least about 45 volume percent of a plastic-insoluble, water soluble particulate material and a liquid at processing temperatures, capable of forming channels between the solid particles. The blend is then formed into any desired product such as by calendering, extruding or molding and thereafter the water soluble particulate matter and channel forming liquid are leached with water from the product to form a porous plastic.

5 Claims, No Drawings

METHOD OF PRODUCING POROUS PLASTIC MATERIALS

The present application is a continuation-in-part of prior application Ser. No. 203,471, filed Nov. 30, 1971, entitled "Method Of Producing Porous Plastic Materials", now abandoned.

BACKGROUND

Numerous methods for producing porous plastics have been described in prior patents and other publications and generally these methods either are uneconomical, do not work well, or ignore ecological considerations. For example, U.S. Pat. No. 3,378,507 discloses the use of octyl sulfosuccinate milled into polyethylene in large amounts and extracted by water to yield a porous structure. With this method, it has been found that large amounts of the expensive sulfosuccinate are needed, on the order of 100 parts by weight per 100 parts of resin (PHR) and even in such quantities only relatively low extraction percentages are obtained indicative of low porosity.

A copending U.S. Pat. application Ser. No. 160,573, filed July 7, 1971, in which Applicants herein are coinventors, discloses the use of polyvinyl methyl ether together with surface-active materials to obtain microporous reverse-osmosis membrane supports. These materials were compounded with polyvinyl chloride in amounts of about 17–40 volume percent and are leached out by water to form very fine pores or channels (0.2 – 0.4 micron), too fine for most purposes except reverse-osmosis membrane supports. Moreover, the water flow rates through such fine pore membrane supports are much lower than in porous plastics produced by the method herein disclosed. In addition, it was found that suitable porosity by this method was obtainable only in relatively thin sheets on the order of 0.010 inch and that attempts to utilize this procedure in sheets of substantially greater thicknesses have not proved efficacious.

The use of solid particulate matter for making porous plastics has also been disclosed in a number of patents. U.S. Pat. No. 3,376,238 discloses milling sugar into plastic and extracting with a solvent, such as sulfuric acid. U.S. Pat. Nos. 2,984,869 and 2,819,981 relate to the use of salt in a plastisol which is fused. The salt is purportedly leached out with water, but this process has not proved satisfactory, since it does not produce a channel network which extends entirely through the plastic body. Consequently, for most purposes, inadequate porosity is the result of using soluble particulate matter, such as salt.

U.S. Pat. Nos. 3,378,507 and 3,379,658 relate to the use of a sodium borate hydrate, together with salt crystals in a plastisol. The purpose of the borate hydrate is to give off steam during fusion of the plastisol and thereby to promote vapor pockets intended to provide intercrystal channeling.

U.S. Pat. No. 2,819,981 relates to improving the "hand" and "slip" characteristics of flexible, vapor permeable plasticized polyvinyl chloride films by the use of a softener as a replacement or in addition to the plasticizer. Mention is made that the softener can replace part of the pore-forming material. Porosity is not enhanced, however, as indicated in terms of water vapor transmission by the addition of such softeners and in thicker coatings the vapor transmission tends to be reduced.

U.S. Pat. No. 3,536,796 relates to the use, in a very high molecular weight polyolefin having a melt index of 0, of at least 30 volume percent of a plasticizer together with filler particles to make porous plastic sheet material. This process is limited to one polymer, is extremely costly because it involves the use of such large quantities of plasticizer and relates to the use of multiple leaching steps using organic solvents.

U.S. Pat. No. 3,551,538 teaches the use of polyethylene oxide in thermoplastic but only about 4–12% of the water-soluble material leaches out and the method is thus only suitable for paper-like structures.

It is the principal object of this invention to provide an improved method of making porous plastics using a combination of plastic-insoluble, water soluble particulate matter in an amount of at least about 45 volume percent and channel forming liquids.

It is a further object of this invention to provide an improved method wherein the solid and liquid materials to be leached from the plastic are relatively inexpensive, and wherein the method utilizes simple water extraction techniques and solid particulate materials, the extraction and disposal of which does not damage the ecology. Indeed, some of the extracted salts can be used as fertilizers and moreover, the invention provides for the use of minimal amounts of channeling liquid which can be readily removed and recycled in the processing.

Another object of this invention is to provide a more efficient method of making porous plastics of superior porosity not heretofore available by water leaching techniques using a combination of water soluble particulate solid and one or more water soluble liquids having the characteristic of forming channels between the voids formed by the solid particles after they have been dissolved.

The above and other objects and advantages of this invention will be more readily appreciated from the following detailed description.

The method embodying this invention may be applied to the production of porous plastics intended for any use, including among others artificial leather, inking pads, ion exchange resins, porous electrodes, porous bearings, filtration devices, fibers and papers, battery separators, vent devices, scrim and textile stiffening devices, aeration and emulsification devices, levitation devices, slow leaching devices, sachet type devices, evaporation devices, surgical implants, embossing, enzyme or catalyst supports, porous carbon structures, adhesive bonding aid, bandages and blood aeration devices, accoustical foam, high fiber content compositions, Kieselguhr substitutes, gasketing and air permeable wall panels.

The method embodying this invention involves the blending with a suitable plastic mass of a plastic-insoluble, water soluble liquid and a water soluble foreign solid particulate matter, such as salt in a critical amount which will be referred to as "critical volume loading" and a water soluble channel forming liquid. Effective mixing of these ingredients may be accomplished in any suitable manner, such as by the use of a Banbury mixer or a twin screw extruder, which has been found particularly effective in such mixing. The compounded material can then be calendered, extruded or compression molded. After the plastic mixture is formed into the desired plastic body, sheet or film structure, its water soluble and liquid fractions may be leached out by immersion of the plastic body into a fresh water bath. The water bath may be suitably agitated to effect proper leaching of the soluble additives. The effectiveness of this process has been determined by comparing the weights of the plastic body before and after leaching and calculating the percentage by weight of the water soluble fraction leached from the plastic. Invariably, the percentages obtained using the process embodying this invention are 80% or greater and generally range in the neighborhood of 90-99%. In contrast, when using either liquid or particulate solids alone, the percentages were generally substantially lower then 80%, particularly in specimens of comparable thickness.

Polymers suitable for purposes of this invention include materials which are fluid at some stage in their processing and which are substantially non-solvents for the foreign solid and the liquid to be subsequently leached by water immersion. Suitable thermoplastics for carrying out this invention include: unplasticized polyvinyl chloride, polyvinyl chloride-propylene copolymer, polyvinyl chloride-ethylene copolymers, polyvinylidene chloride copolymers, polystyrene, impact styrene, ABS resin, styrene butadiene block copolymers, polyethylene low (0.91 sp. gr.) to high density (0.965 sp. gr.), polyethylene copolymers with propylene, butene, 1-pentane, 1-octane, hexene, styrene, etc., polyethylene copolymers with vinyl acetate, alkyl acrylate, sodium acrylate, acrylic acid; etc., chlorinated polyethylene, chlorosulfonated polyethylene, polypropylene and propylene-olefin copolymers, polybutene and butylene-olefin copolymers, poly 4-methyl 1-pentene, thermoplastic polyurethanes, polyamides, e.g. Nylon 6, Nylon 12, Nylon 6/6, Nylon 6/10, Nylon 11, fluorocarbon resins such as FEP, polyvinylidene fluoride, polychlorotrifluoroethylene; acrylonitrile - methyl acrylate copolymers, acrylonitrile - vinyl chloride copolymers, methacrylonitrile-styrene copolymers, polymethyl methacrylate, cellulose acetate, cellulose acetate butyrate, acetal, polycarbonate, polysulfone, polyphenylene oxide, polyethylene and butylene terephthates.

Many thermosetting resins and crosslinkable resins are also suitable for purposes of this invention and include the following: radiation cured polyethylene, peroxide-cured polyethylene, diazo crosslinked polypropylene, epoxy resins; hydrocarbon, chloroprene, and nitrile rubbers, furane, melamine-formaldehyde, urea-formaldehyde, phenol-formaldehyde, diallyl phthalate, polyesters and silicones. Extraction of the soluble constituents may be accomplished before or after crosslinking depending upon the polymer selected. Gums, such as gelatine, collagen, carboxymethyl cellulose, polyacrylamide and polysaccharide may also be used provided they can be rendered water insoluble before extraction. Extraction of the soluble constituents is carried out for such water insolubilizable gums after crosslinking.

In accordance with this invention the solids constituent is used in an amount of at least about 45 volume percent of the total blend which herein is defined as "critical volume loading". It has been found that finely divided particulate materials are suitable for use in carrying out this invention provided the material selected is soluble in water, preferably at room temperatures or decomposes with minimum residue and does not melt or decompose at the polymer compounding temperature. It is, of course, also essential that the solid material selected be insoluble in the plastic mass with which it is used and be compatible therewith. Suitable materials include: inorganic salts and acids, organic salts and organic solids, such as for example: sodium chloride, sodium borate, sodium carbonate, potassium chloride, ammonium chloride, ammonium carbonate, calcium chloride, boric acid, sodium acetate, sodium formate, urea, thiourea, saccharine, starch and lactose. The particle size of the foreign solid, for most purposes, should preferably be about 0.001 inch in diameter. Since particles in this range will leave cavities which are not readily visible to the naked eye, flexible sheets made by this process would be suitable for poromeric usage. For other purposes, including: shoe interiors, coarse filtration membranes, aeration and levitation devices, larger particle size solids may be utilized, such as on the order of 0.010 - 0.020 inch. Of course, where finer channels are desired, such as in certain types of filtration, plastic paper or porous fiber, fuel cell and battery separators, a finer particle could be utilized, such as 1-5 microns.

Channeling liquids which may be used in carrying out the method embodying this invention include essentially any liquid (having a viscosity below 10,000 poise at processing temperature), or combination of liquids, which is substantially insoluble in and compatible with both the polymer to be made porous and the particulate solid material used. The liquid must be capable of forming channels interconnecting the solid particles dispersed polymer and be readily water soluble so that it can be economically leached together with the particulate solid fraction. Thus is provided a pore structure which includes the cavities left by the dissolved crystals and the interconnecting channels formed between the crystals by the liquid. At "critical volume loading" of the dispersed particles surprisingly small quantities of liquid will yield this channel network. Examples of suitable channel forming liquid include detergents or surfactants and various types of water-soluble oils including glycols and polymeric oils. Polyvinyl methyl ether having a molecular weight varying from 500-500,000, polyethylene oxide having a molecular weight varying from 1,000-1,000,000 are suitable polymeric oils. Suitable glycols, detergents or surface active agents may also be employed. At and above "critical volume loading", various channeling liquids in very small quantities from about 0.1 volume percent may be used, including the polymeric oils listed above, glycols and various non-ionic, anionic and cationic surface active agents, including for example:

Useful non-ionic detergents or surfactants based on ethylene oxide condensate derivatives including but not limited by:

| Hydrophobic Base | Commercial Equivalents | HLB No. |
| --- | --- | --- |
| alkyl aryl phenols | e.g. Rohm & Haas Triton X-100 (t-octyl phenol with 9-10 ethylene oxide units) | 13.5 |
| | GAF Igepal CO880 (nonylphenol with 30 ethylene oxide units) | 17.2 |
| fatty sorbose | e.g. Atlas Tween 20 (polyoxyethylene sorbitan monolaurate) | 16.7 |
| fatty alcohols | e.g. Atlas Brij 35 polyoxyethylene lauryl ether | 16.9 |
| fatty mercaptides | e.g. Pennsalt Nonic 218 (polyethylene glycol tertdodecylthio | — |

| Hydrophobic Base | Commercial Equivalents | HLB No. |
|---|---|---|
| fatty acids | ether e.g. Atlas Myrj 52 (polyoxyethylene, 40 units, monostearate) | 16.9 |
| | Atlas G-1790 (polyoxyethylene lanolin) | 11 |
| vegetable oils | e.g. Atlas G-1794 (polyoxyethylene castor oil) | 13.3 |
| silicones | e.g. Union Carbide L-77 (dimethyl silicone-polyalkylene oxide) | — |
| acetylenic alcohols | e.g. Airco Surfynol 475 (ethylene oxide condensate, 75% weight, with 2, 4, 7, 9-tetramethyl-5-decyne-4, 7-diol) | 15 |

Low foam detergents are now available and can be utilized. These materials frequently consist of one of the above categories (usually polyoxyethylene alkyl aryl phenols) with the oxyethylene terminated by a methyl or benzyl group instead of hydrogen. Detergents based on ethylene oxide-propylene oxide-ethylene oxide block polymers are also useful; e.g. Wyandotte Pluronic F68 (80% ethylene oxide block polymer on both sides of a 1750 MW propylene oxide central unit). The HLB No. of the specific examples given, last column above, is defined by Atlas Chemical Co. as: HLB = (E + P)/5

(Griffin, Journal of the Society of Cosmetic Chemists, pg. 251, vol. V, No. 4, Dec. 1954)
wherein HLB + Hydrophile/Lipophile balance
E = weight percentage of oxyethylene content
P = weight percentage of polyhydric alcohol content (glycerol, sorbitol, etc.)

We have not found any particular water soluble or dispersible non-ionic to be unsuitable to the purposes of this invention. Water soluble detergents are preferable to "dispersible" detergents, however. By "dispersible" we mean the ability of the solid or liquid detergent to form a hazy sol in water at room temperature resulting in the disappearance for all practical purposes of the original solid or oil. We cannot define insolubility vs. dispersibility on the basis of HLB number, however, since there is no clear cut-off point. For example, Baker Castor Oil Co. Surfactol 318 castor oil-polyethylene oxide (HLB 3.6) is water dispersible while Atlas Tween 65 polyoxyethylene sorbitan tristearate (HLB 10.5) is water insoluble. We prefer to use detergents containing straight chain hydrocarbons because such materials are more readily biodegradable thereby simplifying disposal problems after the leaching operation.

With regard to ionic detergents, any water soluble or dispersible compound which will withstand the rigors of milling or other melt mastication with the molten thermoplastic appears to be suitable.

The HLB equivalent of ionic detergents and soaps is very high; i.e., 18–40, hence almost universal water solubility is not surprising.

Useful anionic detergent types include but are not limited by:

| | |
|---|---|
| Alkyl aryl sulfonates | e.g. sodium dodecyldiphenyl ether disulfonate, dodecyl benzene sodium sulfonate, butyl benzene sodium sulfonate |
| Alkyl sulfate | e.g. sodium lauryl sulfate |
| Alkyl sulfonate | e.g. sodium ethyl cyclohexane p-sulfonate, castor oil sulfonate (turkey red oil) |
| Napthalene sulfonate | e.g. sodium isopropyl napthalene sulfonate, sodium tetrahydro napthalene sulfonate |
| Phenol sulfonate | e.g. sodium butyl phenyl phenol sulfonate |
| Sulfonated ethoxylated alkyl alcohol | e.g. sodium dodecyloxyethyl sulfonate |
| Sulfonated alkyl aryl polyether | e.g. Rohm & Haas Triton X200 (sodium salt of alkyl aryl polyether sulfonate) |
| Sulfonated esters | e.g. sodium di(2-ethyl hexyl) sulfosuccinate, sodium diamyl sulfosuccinate |
| Alkyl or alkyl aryl phosphate esters | e.g. Rohm & Haas Surfactant QS-30 Witco ("Emcol" or GAF "Gafac" alkyl or alkyl aryl polyethylene oxide phosphates, Lecithin |
| Fluorocarbon phosphate | e.g. DuPont Zonyl S-15 $H(CF_2CF_2)_{4-6}\overset{O}{\underset{\parallel}{P}}(OH)_2$ |
| Fatty or vegetable acid | e.g. sodium oleate trithanol amine stearate |

Cations other than sodium; i.e., potassium, lithium, hydrogen, morpholine, ammonium, triethanol amine, etc., may be utilized with the detergent anion. Multivalent cations such as calcium, magnesium, and barium are sometimes water insoluble, especially with carboxylates, and hence frequently not of interest. Many multivalent-cation-sulfate and sulfonate detergents are water soluble, however (e.g. calcium, magnesium, zinc and/or barium dodecyl diphenyl ether disulfonate salts are substantially water soluble). We prefer sodium because of cost and convenience. The hydrogen or acid form of the detergent is sometimes undesirable from the point of view of equipment corrosion. Ammonium, morpholine and volatile amines can be utilized but the volatility makes them less desirable than the nonvolatile metal salts.

Alkyl amines and ethanol amines such as tributyl amine or triethanol amine are less volatile. Higher molecular weight alkylated amines such as trinonyl amine are usually less desirable because solubility in the plastic phase and water insolubility of the detergent frequently occurs at this point of substitution.

Useful cationic and amphoteric detergents include but are not limited to:

| | |
|---|---|
| Amine oxide | e.g. Armour Armox C/12 bis(2 hydroxy ethyl) cocoamine oxide |
| Ethoxylated amine | e.g. Armour phenyl stearyl amine (ethoxylate 15 mol) |
| Ethoxylated amide | e.g. Nopco AO-43 Polyoxyethylene oleic amide |
| Quaternary | e.g. Cetyl trimethyl ammonium chloride |
| Amphoteric | e.g. General Mills Deriphat 170C N-lauryl β-amino propionic acid, Geigy Sarkosyl L lauroyl sarcosine |

Hence a wide variety of surfactants are suitable. The only requirement being solubility or dispersibility in water. Detergents with an aromatic ring in their hydrophobic portion are preferred, however. Apparently the detergent coats the foreign solid and by capillarity causes a bridging action between very close, barely touching or touching particles. Towards this end, we have found that a minimum of 0.1 volume percent detergent can be utilized at approximately 45-79.9 volume percent foreign solid content.

Minimal amounts of DuPont Duponol ME and General Mills Deriphat 170C should be utilized in polyvinyl chloride because these detergents cause heat stability problems.

The glycol adjuvants consist of low molecular weight polyhydroxy materials limited to the following:
Glycerine: (particularly for medical applications)
EMCol PG; Witco Polymerized glycerol
Ethylene glycol
Polyethylene glycol (MW 136-1000)
Pentaerythritol — where heated processing is utilized
Water — where the processing temperature without pressure does not exceed 95° C.
 Water is generally not used in large amounts but can be utilized in fairly large amounts if it is saturated with the foreign solid before use.

It has also been found that water itself may be used for certain plastics where the water, if used in larger amounts, is saturated with the foreign solids before blending into the polymer.

The amount and selection of channeling liquid depends upon a number of factors, including the type of plastic which is being made into a porous material and the amount of particulate solid matter utilized whether above or below about 45 volume percent loading. At or above this "critical volume loading" an almost unlimited variety of channeling liquids are suitable for use, numerous examples of which are listed above. A sufficient amount of channeling liquid must be insoluble in the main body of the plastic so that the liquid channels can be established between the crystals of the solid particulate matter employed. If the viscosity of the channeling liquid is too great, i.e., over 10,000 poise, very large diameter channels will result in consequent poor cohesion of the plastic mass during compounding and incomplete interconnection of the salt crystals.

In carrying out the process embodying this invention, a polymer such as a molding powder, preferably in the amount of 20-55 volume percent, may be blended with a suitable water-soluble or heat decomposible particulate solid preferably in the amount of about 45-79.9 volume percent and a channeling liquid in the amount of 0.1-15 volume percent; antioxidants or other stabilizers may also be added. To assist in processing certain thermoplastics, it is sometimes desirable to control melt flow by the use of at least 3-4% channeling liquid and sometimes 10-20% liquid at very high salt loadings. The polymer phase may include polymer per se and up to about 80% by volume (preferably 0-50%) of a suitable filler material, such as clay, chrysotile and crocidolite, asbestos fibers and glass fibers. If the PVME utilized is a water solution, the water flashes off during the compounding at temperatures over 95° C. Nylon and urethane compounding may be carried out in a Banbury type mixer or extruder at 200°-280° C because of the high fluxing temperature requirements. Solid matter may be added and worked in after the water-soluble oils are added. Powdered polyethylene and polyvinyl chloride suspension resins are preferably mixed at 80° C with the particulate solid and channeling liquid in a mixer such as a Prodex type mixer. The mixture is then dried and extruded in a vented extruder to remove residual water. A twin screw extruder provides effective means for this processing.

The compounded material can then be calendered, extruded or compression molded. Properly compounded stock up to one-eighth inch in thickness can be satisfactorily leached by tumbling 8-16 hours in water or by immersing the molded object in an agitated tank with fresh water for 8-16 hours. Compounded sheets one-fourth inch thick can be rendered porous by leaching in a tank for 4 hours and then forcing water through the sheets while held in a suitable frame type fixture. The leaching rate of thin sheets can be greatly accelerated by the use of ultrasonic agitation which speeds solution and diffusion of the additives. In most instances hot water affords a faster leaching rate than cold water.

The following examples are given by way of illustration of this invention.

EXAMPLE I

The following materials were worked into fluxing polyethylene on a two roll rubber mill maintained at 120° C. The salt was added last. The stock was sheeted off the mill 75 mils in thickness and subjected to leaching for 16 hours in a circulating water bath fitted with fresh (17°-20° C) water inlet and overflow device.

| Materials | Wt. | Vol. % |
|---|---|---|
| Low density polyethylene (0.918) Melt index 2 | 100 | 46.7 – 48.2 |
| Sodium chloride crystals Microsize A salt[1] 34 μ average particle size | 250 | 50 – 51.8 |
| Antioxidant | 0.1 | 0.05 |

The following table constitutes a tabulation of data listed as Examples 1-18 in which the above process was repeated exactly with the exception being that one or more channel forming liquids were added and in Example 15 Microsize G salt having an average particle siize of 4 μ was substituted for the Microsize A salt:

| Ex. | Channel Forming Liquid (Vol. %) | Wt. % Water Soluble Materials Leached Out |
|---|---|---|
| 1 | None | 29.3 |
| 2 | PVME (1.5)[1] | 94.7 |
| 3 | PVME (3.0) | 94.3 |
| 4 | PVME (0.1) | 82.2 |
| 5 | PVME (1.5) + PEO[1] (1.5) | 96.3 |
| 6 | PEO (0.2) | 91.5 |
| 7 | Triton X-100[1] (0.2) | 96.0 |
| 8 | Benax 2A-1[1] (1.5) | 89.7 |
| 9 | Aerosol OT[1] (1.5) | 81.1 |
| 10 | PVME (1.5) + Triton X-100 (1.5) | 96.7 |
| 11 | PVME (0.4) + Triton X-100 (0.4) | 97.2 |
| 12 | PEO (1.5) Aerosol OT (1.5) | 97.0 |
| 13 | PVME (1.5) + Gafac RE 610 (Acid)(1.5) | 80.0 |
| 14 | PVME (1.5) (ethyl trimethyl ammonium bromide) (1.5) | 95.3 |
| 15 | PVME (0.2)(G salt) | 94.0 |
| 16 | Glycerine (1.7) | 99.0 |
| 17 | Pentaerythritol (2.9) | 94.0 |

[1]Microsize A - Diamond Crystal Salt Co.
PVME - General Aniline & Film - Gantrez M-154 - polyvinyl methyl ether solution, inherent viscosity 0.35 specific viscosity 0.47, K-value 40
PEO - Union Carbide - Carbowax 20M - polyethylene oxide; 20,000 molecular weight
Triton X-100 - Rohm & Haas Co., t-octyl phenol condensed with 9-10 ethylene oxide units
Benax 2A-1 - Dow Chemical Co., sodium dodecyl diphenyl ether disulfonate
Aerosol OT - American Cyanamid Co., sodium di(2-ethyl hexyl) sulfosuccinate These examples show a dramatic improvement in porosity (percent solubles leached out) is obtainable by the use of a channel forming liquid combined with a leachable salt as compared to the use of salt alone. In each case the salt used was in excess of 45 volume percent loading.

The milled sheets of Examples 1 and 2 were subjected to water flow through tests at 40 psi with the result being that for Example 1 90 gal/sq ft/day was obtained, while 67,000 gal/sq ft/day was obtained using the porous product of Example 2.

In the following examples a series of tests were conducted in which polyethylene (42.6 – 52.2 vol. %) was milled with a number of different water soluble particulate materials (44.8 – 55.4 vol. %), PVME (1.5 vol. %) and Triton X-100 (1.5 vol %). The polyethylene was banded on a two roll rubber mill maintained at 120° C. The different solids were each passed through a 200 mesh sieve and added to the polyethylene. The stock was sheeted off the roll and was compression molded at 135° C to specimens 20 mils thick, except for Examples 24-26 the specimens were 75 mils. For Examples 10–22 the press molded sheet was extracted 20 hours in a circulating bath with a fresh (17°–20° C) tap water inlet and overflow device and dried; for Example 23, 90° C water was used for 11 hours; Example 24, 90° C water with 1% HCl for 4 hours plus 3 hours in an oven at 80° C; Example 25, 90° C water with 1% HCl for 8 hours plus 16 hours in an oven at 80° C; and Example 26,25° C water with 1% HCl for 8 hours plus 16 hours in an oven at 80° C. Surface gloss was measured with a 60° Gardner Glossmeter (ASTM D523-66T).

| Ex. | Solid (vol. %) | % Leached Out | Surface Gloss |
|---|---|---|---|
| 10 | NaCl (50) | 96.7 | 30 |
| 19 | $K_2CO_3$ (48.5) | 98.7 | 45 |
| 20 | $CH_3COOK$ (54.4) | 96.6 | 20 |
| 21 | $MgSO_4$ (44.8) | 91.5 | 53 |
| 22 | $(NH_4)_2Al_2(SO_4)_2$ (55.4) | 97.1 | — |
| 23 | Fisher Soluble Starch (45) | 79.0 | 20 |
| 24 | Paraformaldehyde (45) | 80.7 | — |
| 25 | Paraformaldehyde (45) | 85.6 | — |
| 26 | Paraformaldehyde (45) | 57.9 | — |

These examples show that a large variety of particulate, polymer-insoluble, water soluble solids may be used so long as they are compatible with the selected polymer and channel forming liquid. The high surface gloss attained was unexpected and is apparently due to the small holes (2-10 micron) formed in the surface of the polymer and a selectively low percentage surface area holes (10–20%) despite the high internal porosity. Examples 24–26 illustrate removal of decomposible solid particulate material by the use of heat and catalyst (HCl).

Moisture vapor transmission (MVT) of Example 19 material was compared with shoe leather finished on one side without waxing and also a number of poromoric materials. The samples were aged in a humidity chamber before testing.

| Sample | MVT Gram × Mils Thickness/ 24 hr/100 sq.in. |
|---|---|
| Example 19 | 8100 |
| Leather | 5300 |
| "Porvair" (Inmont Corp.) | 3300 |
| Aztran (Goodrich Co.) | 2900 (skin & felt backing) |
| Aztran (Goodrich Co.) | 1260 (skin only) |

The following table constitutes a series of examples illustrating the use of a number of different polymers. The listed polymers were compounded with NaCl salt Microsize A or G, and channeling liquids in various combinations. Suitable antioxidants or heat stabilizers were employed where appropriate for the selected polymers. Stock was sheeted approximately 75 mils thick when formed in a mill roll and press molded 20 mils thick. Extraction of the salt and channeling liquids was carried out for 16–24 hours at 20° C in a circulating water path. PVME — is Gantrez 154 solids unless otherwise noted.

| Ex. | Resin | Channeling Liquid (vol. %) | Type Salt (vol. %) | Wt. % of Water Soluble Materials Leached Out |
|---|---|---|---|---|
| 10 | Polyethylene (low density) | PVME (1.5) + Triton (1.5)* | A (50) | 96.7 |
| 27 | Ethylene/vinyl acetate | PVME (1.5) + Benax (1.5)* | A (50) | 94.3 |
| 28 | Polybutene | PVME (1.5) + Triton (1.5) | A (50) | 96.8 |
| 29 | Chlorinated polyethylene | PVME (1.5) + Triton (1.5) | A (56) | 95.6 |
| 30 | Polystyrene | PEO (1.5) + Benax (0.65) | G (53) | 97 |
| 31 | Polystyrene | PVME (2.1) + Benax (4.3) | A (52) | 92.7 |
| 32 | Polyethylene | PVME (1.5) | A (52) | 97.3 |

-continued

| Ex. | Resin | Channeling Liquid (vol. %) | Type Salt (vol. %) | Wt. % of Water Soluble Materials Leached Out |
|---|---|---|---|---|
|  | (high density) | + Triton (1.5) |  |  |
| 33 | Polypropylene | PVME (4.3) | G (44) | 97 |
| 34 | Polypropylene | PEO (1.5) + Aerosol OT*(1.5) | G (50) | 97 |
| 35 | Nylon 6 | PVME (4.3) + Benax 2A-1 (1.9) | G (52) | 99.5 |
| 36 | Polyurethane | PVME (4.3) + Benax 2A-1 (1.9) | G (48) | 97.5 |
| 37 | Vinyl chloride/ propylene | PVME (5.3) + Triton (3.7) | G (50) | 95.3 |
| 38 | Vinyl chloride/ propylene | PVME (0.2) | A (50) | 94.5 |
| 39 | Vinyl chloride/ propylene | PVME (2.0) | A (50) | 99 |
| 40 | Styrene acrylonitrile copolymer | PVME (6.5)[2] | G (45) | 95.0 |
| 41 | Cellulose nitrate poly- ethyl acrylate blend | PVME (1.3) +Benax 2A-1 (0.65) | G (66) | 99.0 |
| 42 | Polyethylene | Deriphat (0.2)* | A (37) | 72 |
| 43 | Polyethylene | Deriphat (0.2) | A (45) | 90 |
| 44 | Polyethylene | Triton X-100*(0.2) | A (37) | 58 |
| 45 | Polyethylene | Triton X-100 (0.2) | A (45) | 87 |
| 46 | Polyethylene | PEO* (0.2) | A (37) | 50 |
| 47 | Polyethylene | PEO (0.2) | A (45) | 89 |
| 48 | Polyethylene | Glycerine (0.2) | A (37) | 66 |
| 49 | Polyethylene | Glycerine (0.2) | A (45) | 84 |
| 50 | Polyethylene | Benax* (0.2) | A (37) | 32 |
| 51 | Polyethylene | Benax* (0.2) | A (45) | 84 |
| 52 | Polyethylene | PEO* (0.2) | A (37) | 50 |
| 53 | Polyethylene | PEO (0.2) | A (45) | 89 |
| 54 | Epoxy/DETA[3] | — | A (45) | 30 |
| 55 | Epoxy/DETA[3] | Water Saturated with NaCl (2) | A (45) | 97 |
| 56 | Epoxy/DETA[3] | PVME (2) | A (45) | 97 |
| 57 | PVME - BASF Lutonol M-40 (solvent-free "high viscosity") K value: 50; inherent viscosity - 0.68 |  |  |  |
| 58 | PVME - GAF Gantrez M-155 polyvinyl methyl ether, inherent viscosity 0.57 |  |  |  |
| 59 | 100 parts by weight EPON 828 Shell Chemical Co./ 10 parts by weight diethylene triamine, cured - 75 mil sheet |  |  |  |

(3) See below
*Triton X-100
Aerosol OT
Benax       } See definitions on Page 20.
PVME
Deriphat - N-Lauryl myristyl-beta-propionic acid
PEO      - Union Carbide polyethylene oxide - 20,000 molecular weight From the above Examples, it will be appreciated that the product of this invention is broadly applicable to polymers of all types and that even at critical volume solids loading poor porosity results unless some channeling liquid is also used.

The following table contains a series of examples in which viscous liquid prepolymers were mixed with salt and channeling liquid and allowed to "set" or polymerize.

The following epoxy formulations were prepared by premixing the epoxy system (100 parts by weight Shell EPON 828 and 10 parts diethylene triamine[3]) with channeling liquid composed of 1.5 volume percent sodium alkyl aryl sufonate and 6 volume percent PVME/$H_2O$ 50/50 and 250 parts by weight (50–51.8 volume percent) of NaCl Microsize A salt. The polyester formulations used the same salt and channeling liquid content as the epoxy formulations with 100 parts by weight cobalt-activated styrene-thinned unsaturated polyester available as Laminac 4110 from American Cyanamid Co. MEK Peroxide 60% active 0.83 parts/100 Laminac was added after the other ingredients were thoroughly mixed together.

| Ex. | Resin | Thickness Mils | % of Water Soluble Leached Out |
|---|---|---|---|
| 60 | Epoxy | 20 | 95 |
| 61 | Epoxy | 20 | 95.3 |
| 62 | Epoxy | 175 | 96.3 |
| 63 | Polyester | 20 | 98.5 |
| 64 | Polyester | 20 | 96.8 |
| 65 | Polyester | 140 | 99 |

The following table provides a series of examples in which various concentrations of salt were utilized with various channel forming liquid combinations in different concentrations. The base polymer utilized was low (0.918) density polyethylene (Melt Index 2). Compounds were fluxed on a two roll rubber mill at 110° C and sheeted off at 75 mils thickness.

| Ex. | PVME Solids Vol. % | Triton X-100 Vol. % | Micro A Salt Vol. % | % of Water Soluble Materials Leached Out |
|---|---|---|---|---|
| 66 | 13.1 | 13.1 | 0 | 38 |
| 67 | 14.7 | — | 25 | 77 |
| 68 | 0.2 | — | 37 | 56 |
| 69 | 2 | — | 37 | 58 |

-continued

| Ex. | PVME Solids Vol. % | Triton X-100 Vol. % | Micro A Salt Vol. % | % of Water Soluble Materials Leached Out |
|---|---|---|---|---|
| 70 | 14.7 | — | 37 | 80 |
| 71 | 0.2 | — | 45 | 86 |
| 72 | 0 | — | 52 | 29.3 |
| 73 | 0.1 | — | 52 | 82.2 |
| 74 | 0.37 | 0.37 | 51 | 97.2 |

From the above Examples, it can be seen that to obtain a percentage of leachables of 80 or greater when the amount of leachable particulate solid material in the resin is substantially lower than 45 volume percent, it is necessary to use at least about 15 volume percent (Example 70) of a polymeric oil as a channeling liquid. In contrast, with channeling liquid and a salt content of about 45% or greater (Examples 71, 73, 74) percentages of leached out solubles were in the range of 82-97%, with the amount of channeling liquid required being markedly less than 15 volume percent. This unexpected result cannot, however, be attributed to the large quantities of salt alone, since Example 72 demonstrates that 52 volume percent salt without any channeling liquid yields an extractability of only 29.3 percent.

EXAMPLE 75

This experiment was carried out to show that the invention can be practiced in conjunction with a conventional gas-forming blowing agent to yield lower density porous structures than would normally be obtained by leaching methods.

| Vol. % | Materials |
|---|---|
| 46.3 | Hercules Pro-fax 6523 Polypropylene (Melt Index 4) |
| 49.4 | Diamond Microsize G Salt |
| 0.1 | Geigy Irganox 1010 antioxidant |
| 0.85 | Blowing agent; National Polychemicals, Inc. Kempore 125 (azo bis formamide) |
| 1.42 | PVME - GAF Gantrez M-154 |
| 1.42 | Triton X-100 |
| 0.53 | Hercules S-3009 proprietary diazido crosslinker, 50% on silica |

The charge was milled at 177° C on a two roll rubber mill. The Hercules S-3009 was milled in last. Pieces of the milled stock were pressed in a sealed mold 20 mils thick 4-6 minutes at 204° C, cooled to 163° C and the mold opened hot. The surface remained glossy. Small bubbles were evident (magnifying glass) in the interior, under the surface layer. 95% of the water solubles were removed by 17 hours leaching.

Leached samples of this composition were glossy in appearance and possessed densities ranging from 0.201 to 0.308 grams/cc (12.3 - 19 lbs./cubic foot) and were 38-50 mils thick.

Similarly, the polymer mass may be blown with other blowing agents—e.g., 4,4' oxybis (benzene sulfonhydrazide), dinitrosopentamethylene tetramine, and trihydrazino-s-triazene—to form small bubbles before leaching. Crosslinking agents are not required, but help to attain smaller bubble size in a press molding operation. Extrusion might utilize either decomposible solid blowing agents, liquid impregnated pellets (Freons, pentane) or gas or liquid added through the extruder vent (nitrogen, Freons, pentane).

EXAMPLE 76

A 23 mils thick sheet of the Example 19, compounded low-density polyethylene was laminated to desized, dry, 7 mil thick Style 400, 80 × 80 cotton print cloth (Test Fabrics, New York, N. Y.) by press molding at 163° C. Final thickness was 25 mils. The laminate was leached and yielded a tough, white leather-like composition with low extensibility. A drop of 0.1% methyl violet in isopropanol pentrated through to the cloth side readily but distilled water beaded on the surface without penetrating.

The channeling liquids embodying this invention and used in the above Examples are characterized by a viscosity of less than 10,000 poise at the polymer processing temperatures.

The validity of this criterion was established by utilizing in two separate experiments polyvinyl alcohol DuPont (51-03) and polyvinyl pyrrolidone (MW—10,000). Each was blended into low density polyethylene with 52 volume percent salt and in both cases these oils had a viscosity of greater than 10,000 poise at processing temperatures. The percentage of leachables using the alcohol was 38% and using the PVP — 32%. Thus, in accordance with this invention, channeling oils useful in carrying out this invention are those having a viscosity at the plastic processing temperatures of less than 10,000 poise.

Porous plastics produced by the method embodying this invention are found suitable for vacuum forming and orientation and may be handled with conventional forming equipment. Indeed, much greater draw depths were obtainable in the porous sheets after leaching than before. In addition, the porous plastics made by the process embodying this invention are also useful for forming lower density porous structures by the use of conventional blowing agents.

In light of the above teachings, other modifications and variations in this method and various new products and materials obtainable thereby, will be evident to those skilled in the art.

Having thus described this invention, what is claimed is:

1. Method of making porous plastic bodies comprising the steps of dispersing in a fluxable polymer, substantially unplasticized, at least about 45 volume percent of a water-soluble material in particle form and blending therewith a channel-forming water-soluble liquid of less than 10,000 poise at the processing temperature of the polymer, the amount of said liquid being from 0.1 to 15 volume percent to form a network of channels interconnecting the dispersed particles, fluxing and solidifying the polymer blend containing said particles and liquid into a polymer body, and thereafter extracting with water said solid and liquid materials to form a porous plastic body.

2. Method of making porous plastic bodies as set forth in claim 1, in which said water-soluble liquid is selected from the group consisting of a polymeric oil, a detergent, glycerine, ethylene glycol, diethylene glycol, water and salt water.

3. Method of making porous plastic bodies as set forth in claim 1, in which said water-soluble liquid is polyvinyl methyl ether.

4. Method of making porous plastic bodies as set forth in claim 1, in which said polymer contains a gas-forming blowing agent to assist the said solid material and liquid in forming pores in said porous body.

5. Method of making porous plastic bodies as set forth in claim 1, in which the material extracted to form said porous plastic body is at least 80 percent of the total weight of the particle material and water-soluble liquid blended with the polymer.

* * * * *